(12) United States Patent
Sangeneni

(10) Patent No.: US 12,399,688 B2
(45) Date of Patent: *Aug. 26, 2025

(54) DEVELOPMENT PLATFORM FOR IMAGE PROCESSING PIPELINES THAT USE MACHINE LEARNING WITH USER INTERFACE

(71) Applicant: SiMa Technologies, Inc., San Jose, CA (US)

(72) Inventor: Naveen Kumar Sangeneni, Fremont, CA (US)

(73) Assignee: SiMa Technologies, Inc., San Jose, CA (US)

(*) Notice: Subject to any disclaimer, the term of this patent is extended or adjusted under 35 U.S.C. 154(b) by 148 days.

This patent is subject to a terminal disclaimer.

(21) Appl. No.: 18/132,322

(22) Filed: Apr. 7, 2023

(65) Prior Publication Data
US 2024/0338179 A1    Oct. 10, 2024

(51) Int. Cl.
| | |
|---|---|
| G06F 8/20 | (2018.01) |
| G06F 3/04847 | (2022.01) |
| G06T 1/20 | (2006.01) |
| G06V 10/94 | (2022.01) |
| G06F 3/0486 | (2013.01) |

(52) U.S. Cl.
CPC ............ G06F 8/20 (2013.01); G06F 3/04847 (2013.01); G06T 1/20 (2013.01); G06V 10/945 (2022.01); G06V 10/955 (2022.01); *G06F 3/0486* (2013.01); *G06T 2200/24* (2013.01); *G06T 2200/28* (2013.01)

(58) Field of Classification Search
CPC ....................................................... G06F 8/20
USPC ......................................................... 717/101
See application file for complete search history.

(56) References Cited

U.S. PATENT DOCUMENTS

| | | | |
|---|---|---|---|
| 10,078,717 B1* | 9/2018 | Venkataramani | ... G06F 30/3315 |
| 10,360,654 B1* | 7/2019 | Maiyuran | ............... G06F 9/455 |
| 10,922,462 B1 | 2/2021 | Chen | |
| 2013/0073498 A1 | 3/2013 | Izhikevich et al. | |
| 2018/0082397 A1* | 3/2018 | Bobrovsky | ............. G06F 9/544 |
| 2018/0113797 A1 | 4/2018 | Breslow et al. | |
| 2019/0324759 A1 | 10/2019 | Yang et al. | |

(Continued)

OTHER PUBLICATIONS

Richard Lin et al. "Weaving Schematics and Code: Interactive Visual Editing for Hardware Description Languages"—UIST '21, Oct. 10-14, 2021, Virtual Event, USA.*

(Continued)

*Primary Examiner* — Francisco J Aponte
(74) *Attorney, Agent, or Firm* — Fenwick & West LLP

(57) ABSTRACT

A development platform for implementing a machine learning pipeline on a chip containing multiple hardware compute elements. The development platform includes a user interface, a library of software blocks, and a synthesis engine. The user interface facilitates a user to develop a functional description of the machine learning pipeline. The functional description specifies multiple functional modules, including a machine learning model. The synthesis engine synthesizes the pipeline of functional modules into multiple interconnected executable components of software blocks and generates an implementation package including the executable components and specifying interconnections between the executable components.

21 Claims, 12 Drawing Sheets

(56) References Cited

U.S. PATENT DOCUMENTS

| | | | |
|---|---|---|---|
| 2020/0250203 A1 | 8/2020 | Calco et al. | |
| 2021/0055915 A1* | 2/2021 | Guo | G06F 8/34 |
| 2021/0081836 A1* | 3/2021 | Polleri | G06F 8/77 |
| 2021/0081837 A1* | 3/2021 | Polleri | G06N 5/022 |
| 2021/0273993 A1 | 9/2021 | Shirley et al. | |
| 2022/0107812 A1 | 4/2022 | Foley | |
| 2022/0138004 A1 | 5/2022 | Nandakumar | |
| 2022/0261631 A1* | 8/2022 | Cohen | G06N 20/00 |
| 2022/0283787 A1 | 9/2022 | Tang et al. | |
| 2023/0080439 A1 | 3/2023 | Saha et al. | |
| 2023/0083891 A1 | 3/2023 | Achin et al. | |
| 2023/0161882 A1 | 5/2023 | Kumar | |
| 2023/0195471 A1* | 6/2023 | Millar | G06F 9/3877 712/22 |
| 2023/0305814 A1* | 9/2023 | Sumeet | G06F 30/343 |
| 2024/0193018 A1* | 6/2024 | Situnayake | G06F 9/5038 |
| 2024/0220572 A1* | 7/2024 | Jain | G06F 17/16 |
| 2024/0241651 A1 | 7/2024 | Wang et al. | |
| 2024/0320036 A1* | 9/2024 | Nandakumar | G06F 8/34 |
| 2024/0338183 A1* | 10/2024 | Sangeneni | G06F 8/34 |
| 2024/0338265 A1* | 10/2024 | Sangeneni | G06F 8/34 |
| 2025/0045492 A1* | 2/2025 | Koiek Akino | G06F 30/27 |

OTHER PUBLICATIONS

Minutoli, Marco, et al. "Soda: a new synthesis infrastructure for agile hardware design of machine learning accelerators." Proceedings of the 39th International Conference on Computer-Aided Design. 2020.*

Uliana, David, Peter Athanas, and Krzysztof Kepa. "FPGA-based accelerator development for non-engineers." 2014 International Conference on ReConFigurable Computing and FPGAs (ReConFig14). IEEE, 2014.*

PCT International Search Report and Written Opinion, PCT Application No. PCT/US2024/011655, Apr. 17, 2024, 18 pages.

United States Office Action, U.S. Appl. No. 18/132,319, filed Dec. 18, 2024, 35 pages.

* cited by examiner

```
main.c x CenterNet_1.json                                                                    500F
1   .
2   .
3   .
4   // Increase max listeners for event emitters
5   require('events').EventEmitter.defaultMaxListeners = 100;
6
7   const gulp = require('gulp');
8   const util = require('./build/lib/util');
9   const path = require('path');
10
11  // Fast compile for development time
12  gulp.task('clean-client', util.rimraf('out'));
13  gulp.task('compile-client', ['clean-client'], compilation.compileTask('out', false));
14  gulp.task('watch-client', ['clean-client'], compilation.watchTask('out', false));
15
16  // full compile, including nts and inline sources in sourcemaps, for build
17  gulp.task('clean-client-build', util.rimraf('out-build'));
18  gulp.task('compile-client-build', ['clean-client-build'], compilation.compileTask('out-build', false));
19  gulp.task('watch-client-build', ['clean-client-build'], compilation.watchTask('out-build', false));
20
21  // Default
22  .
23  ..
24
25
```

Output   Debug   Logs
[09:43:36] Erasing 231 ms
[09:43:36] Programming or Flash Starting 248 ms

| Home | Recent | Spaces | People | Apps | Templates | Create | 🔍 Search |

Space

❯ Device Communication Service
  • Install implementation pkg
❯ Log and Analysis
  . . .

❯ Packaging MLSoC applications
  • Implementation pkg JSON Format
  • Implementation pkg documentation

. . .

```
 1
 2
 3
 4
 5
 6    .
 7    .
 8    .
 9    "yocto": {
10       "name": "Yocto build name",
11       "type": "Yocto build time",
12       "md5-hash": "Youcto build md5has",
13       "location-remote": "s3:some/location/on/s3/yocto",
14       "location-local": "/opt/bin/",
15       "CVU_BIN": "CVU_3.bin", //VDP Prepares this
16       "APU_BIN": "APU_3.bin" //VDP Prepares this
17    }
18    .
19    .
20    .
21
```

Related pages

| Implementation pkg documentation | Packaging MLSoC applications | List of Plugins and their options |

FIG. 5H

DEVELOPMENT PLATFORM FOR IMAGE PROCESSING PIPELINES THAT USE MACHINE LEARNING WITH USER INTERFACE

BACKGROUND

1. Technical Field

This disclosure relates generally to the implementation of machine learning models on hardware, and more particularly to synthesizing hardware agnostic functional descriptions into a pipeline of executable components that are executed on different hardware compute elements.

2. Description of Related Art

Machine learning (ML) is one of the most powerful recent trends in technology. In machine learning, a model is developed to perform a certain task. The model, which will be referred to as a machine learning network or machine learning model, is trained and deployed in order to carry out that task. For example, a model may be developed to recognize the presence of objects within images captured by a set of cameras. Once the model is deployed, images captured by the cameras are input to the model, which then outputs whether or to what confidence level objects are present within the images.

Image processing pipelines that include machine learning networks may be implemented on different types of hardware, including on chips in edge devices. However, every chip vendor may have their own proprietary hardware with its own compiler. When engineers are faced with a new application, it may take a long time for the engineers to develop the pipeline for the application. Existing development platforms do not provide a way for engineers to easily and quickly realize their solutions in a prototype format.

BRIEF DESCRIPTION OF THE DRAWINGS

Embodiments of the disclosure have other advantages and features which will be more readily apparent from the following detailed description and the appended claims, when taken in conjunction with the example embodiments in the accompanying drawings, in which:

FIG. 5F is an example GUI of the VDP in source code view, where users can view and edit source code generated by the VDP.

FIG. 5H is an example GUI of the VDP in executable code view, where users can view and install an implementation package onto the SoC.

DETAILED DESCRIPTION OF THE PREFERRED EMBODIMENTS

Figure 1:
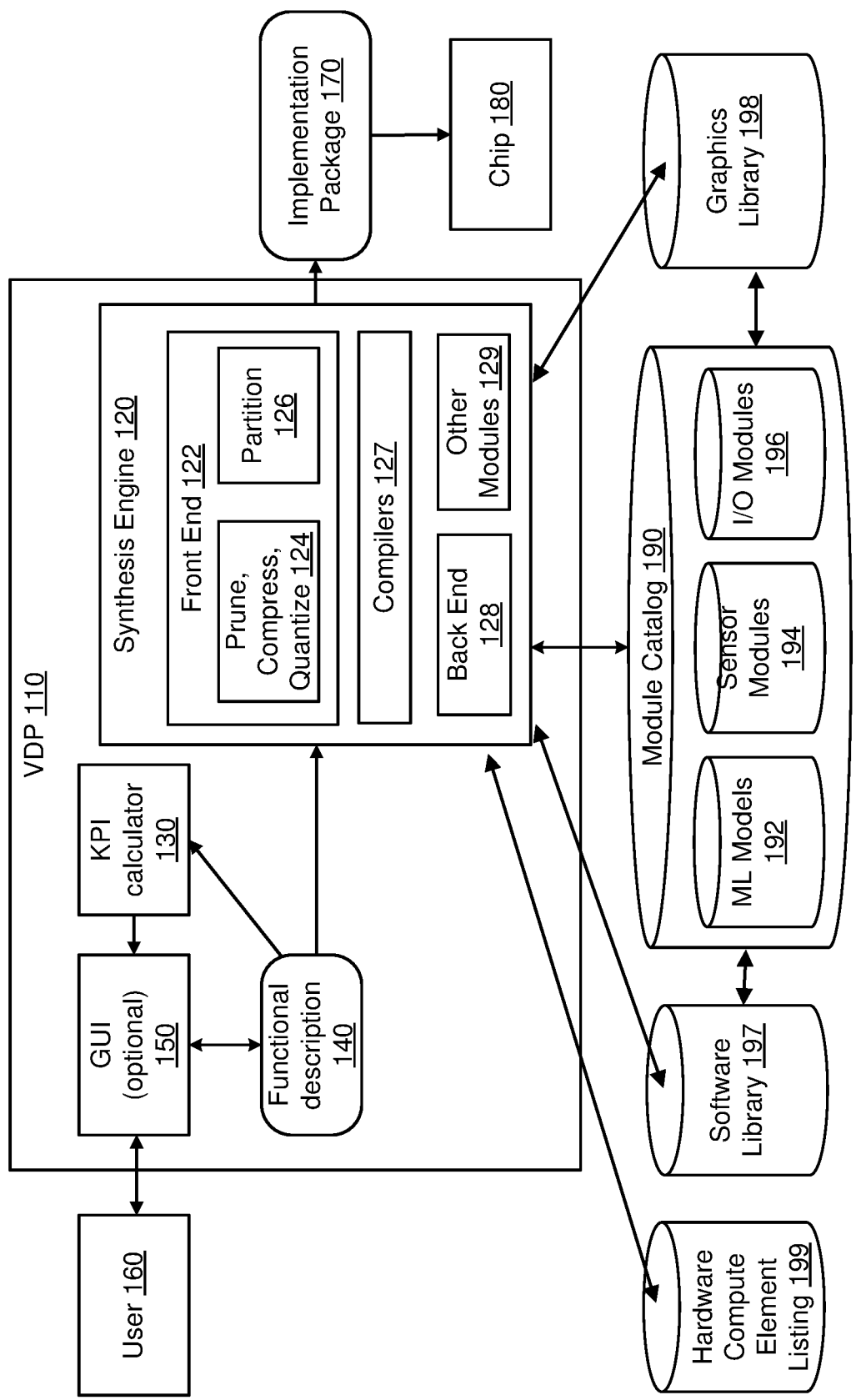
FIG. 1 is a block diagram of an example system with a vision development platform (VDP) for use with developing a system on chip (SoC).

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Machine learning networks (MLNs) are commonly implemented in computing facilities with access to significant resources, such as in the cloud or on server clusters. However, the sources of input to ML networks may be located remotely from these large computing facilities. For example, cameras and other types of sensors may be edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, classification and pattern recognition tasks. For edge devices, it may be desirable to perform certain tasks in real-time. In addition to memory and other programmable processors, an edge device may also include sensors, such as cameras including both still image and video cameras, microphones, temperature sensors, pressure sensors and other types of sensors.

The sensors may capture samples that are used as inputs to a computing pipeline implemented on the edge device. Thus, it would be beneficial if MLNs could also be implemented in edge devices since computing pipelines may include MLNs as one (or more) stages in the pipeline. A machine learning accelerator (MLA) is described herein that may be built into an SoC (system on chip) of an edge device. Additional examples of MLAs and corresponding compilers are described in U.S. Pat. No. 11,321,607, entitled "Machine Learning Network Implemented by Statically Scheduled Instructions, with Compiler," granted on May 3, 2022.

Different SoCs may have different hardware compute elements, such as MLAs but also including other types of processors. In order to implement a computing pipeline using these hardware elements, engineers must decide which functions should be performed by which hardware compute elements, they must then develop the corresponding software programs including passing data between the different hardware elements, and then they must deploy the entire package on the SoC. This can be a complex task and there can be a long learning curve for the engineers to develop their applications and visualize a proof of concept. Existing development platforms do not provide a way for engineers to easily realize their solutions in a prototype format.

The principles described herein address the above-described problem by providing a development platform (running on a computer system) that allows users to build their pipeline using a graphical user interface (GUI) without having to write significant amounts of code. The following examples are based on image processing pipelines (including video processing), so the platform is referred to as a "vision development platform" (VDP), but similar development platforms may also be developed for other types of computing pipelines.

The VDP can provide a catalog of functional modules from which the user can assemble their pipeline. Examples include ML models, sensor modules, processing modules, networking modules, applications, and plugins. Functional modules can include modules from open source repositories or other third party sources. The VDP can also suggest networks of functional modules based on desired applications.

The VDP can also check the pipelines formed by users. In some embodiments, the VDP generates modifiable JSON files used to run the pipeline on a chip, and compiles and generates packages for binaries, applications and/or JavaScript object notation (JSON) files. In some embodiments, the VDP also provides build time and run time statistics of how the pipeline will perform on the chip. In some embodiments, the VDP is also able to remotely manage devices running pipelines for users and/or build analytics for the users.

For example, a given chip includes a plurality of hardware compute elements, one of which is an MLA. A user wants to use the chip to implement an ML pipeline, which is a computing pipeline that uses a machine learning model. The ML pipeline may be an image processing pipeline, for example. The user can use the VDP and its catalog of functional modules to quickly and easily design a pipeline for execution on the SoC without having to know the details of the hardware compute elements on the SoC.

The VDP may include a catalog of functional modules, and a library of corresponding software blocks that implement the functional modules. Each of the software blocks corresponds to an atomic functional stage of a functional module that is to be executed by a hardware compute element. Some functional modules may include a single software block, so that the entire functional module is executed by a single hardware compute element. Other functional modules may include multiple software blocks, so that different parts of the functional module are executed by different hardware compute elements.

A user can enter a functional description of a computing pipeline that specifies the functional modules that form the pipeline, e.g., ML models, sensor device functional modules, input/output (I/O) device functional modules, etc. The functional description may be hardware agnostic, i.e., the user does not need to specify which hardware compute element is to perform which part of the functional module or pipeline. The entering of the functional description of the computing pipeline can be performed via a GUI or descriptive language. Based on the user input, the VDP accesses the software library, retrieves the software blocks corresponding to the functional modules in the pipeline, and compiles the software blocks into executable components for corresponding hardware compute elements.

The VDP then generates an implementation package that includes the executable components and specifies the interconnections between them. In some embodiments, the interconnections are described in JSON files. The implementation package includes the executable components and the JSON files. The implementation package can then be deployed onto the SoC. The SoC includes a pipeline manager that parses the implementation package and distributes the different executable components to different hardware compute elements for execution in a proper sequence. As such, a user is able to use functional descriptions to develop application projects that can be executed on the SoC without having to learn the specifics of the proprietary hardware of the SoC. For example, the user does not need to know how an ML model is partitioned into software blocks or which hardware compute element on the SoC executes each of the software blocks.

FIG. 1 is a high-level diagram of such a system. The system includes a VDP 110 for use with a chip 180. The VDP 110 includes a synthesis engine 120 that receives the functional description 140 of an ML pipeline from a user 160. The functional description 140 specifies the functional modules (from catalog 190) that form the ML pipeline. At least one of the functional modules includes an ML model. The synthesis engine 120 synthesizes the functional description 140 into interconnected executable components (part of implementation package 170 in FIG. 1), each of which is to be executed by a particular hardware compute element of the chip 180.

In some embodiments, synthesis engine 120 has access to catalog 190 of the functional modules, a software library 197, and a hardware compute element listing 199. The functional module catalog 190 includes names and/or descriptions of multiple functional modules. The functional modules may include ML models 192, sensor device functional modules 194, I/O device functional modules 196, etc. The software library 197 includes software blocks used to implement the functional modules in the catalog 190. In some embodiments, the software blocks include source code files written in one or more particular computer-programming languages, such as C, C++, Java, etc. The hardware compute element listing 199 includes descriptions of multiple hardware compute elements that are implemented in the chip 180. Such hardware compute elements may include various application processing units (APU) MLAs, computer vision units (CVUs), and other processors or compute elements.

The synthesis engine 120 receives the functional description 140 of a computing pipeline, which includes multiple functional modules and their interconnections. The synthesis engine 120 accesses the functional module catalog 190 and the software library 197 to retrieve the software blocks corresponding to the functional modules. As discussed above, certain functional modules may include multiple functional stages executed on different hardware compute elements. Such a functional module corresponds to multiple software blocks, each of which is compiled separately to generate a separate executable component. The synthesis engine 120 maps each of the executable components to a particular hardware compute element implemented in the chip 180. The executable components and their interconnections are then packaged into an implementation package 170 and deployed onto the chip 180.

For example, the computing pipeline may include an ML model. The ML model may include three interconnected software blocks, one of which is to be executed by an MLA of the chip, and the other two are to be executed by an application processing unit (APU) of the chip. The synthesis engine 120 also connects the executable components corresponding to different functional modules into a pipeline of interconnected executable components. The interconnections among the executable components are written in a particular format and stored in files, such as in JSON file(s). The files and the executable components are packaged into an implementation package 170 and deployed onto the chip 180.

In some embodiments, the synthesis engine 120 includes one or more frontend modules 122, a compiler module 127, and one or more backend modules 128. The front end modules 122 for ML models include pruning, compression, and quantization modules 124 and a partition module 126. The pruning module 124 removes parts of the ML model that do not contribute significantly to the overall results. The quantization module 124 reduces the resolution of calculated values. Because ML models contain a large amount of data, the compression module 124 may be used to reduce data transfer bandwidths.

As discussed above, certain functional modules may include multiple stages, which are mapped to software blocks that are executed on hardware compute elements of the chip 180. The partition module 126 partitions certain ML models into multiple stages. In some embodiments, the partition and mapping of the different stages may be based on specializations of each hardware compute element implemented on the chip 180. For example, an ML model may be partitioned into a tensor multiplication block and a nonlinear operator block. The tensor multiplication block may be mapped to an MLA for execution, and the nonlinear operator block may be mapped to an APU for execution.

The compiler module 127 compiles the software blocks for the different functional modules into executable components. Each of the executable components is executable on a particular hardware compute element. The backend module 128 performs operations after the compilation of the source code. For example, the backend module 128 may include a pipeline generator that links the executable components in a particular sequence and generates the implementation package 170 containing the executable components and their interconnections. The synthesis engine 120 may also include additional modules or functions 129.

In some embodiments, VDP 110 provides a graphical user interface (GUI) 150 that a user can use to provide specifications of the chip 180 and the functional description 140 of a computing pipeline. The specifications of the chip 180 include one or more hardware compute elements implemented on the chip 180. In some embodiments, VDP 110 has access to a graphics library 198 that stores graphics representing the functional modules. The VDP 110 allows the user to visualize the pipeline in the GUI, using the graphics corresponding to the functional modules of the pipeline.

In some embodiments, the GUI 150 displays the catalog 190 of functional modules. A user can select one or more functional modules from the displayed catalog. In some embodiments, the GUI 150 includes a canvas view that allows the user 160 to drag and drop functional modules from the catalog onto a canvas area. When a functional description is dragged onto the canvas area, VDP 110 accesses the graphics library 198 to retrieve a graphic corresponding to the functional module and display the graphic on the canvas. The user can then link the graphics with connectors (e.g., lines and arrows) to indicate connections between the functional modules. In some embodiments, GUI 150 includes a code view that allows the user to view and edit the corresponding software code.

Figure 2:
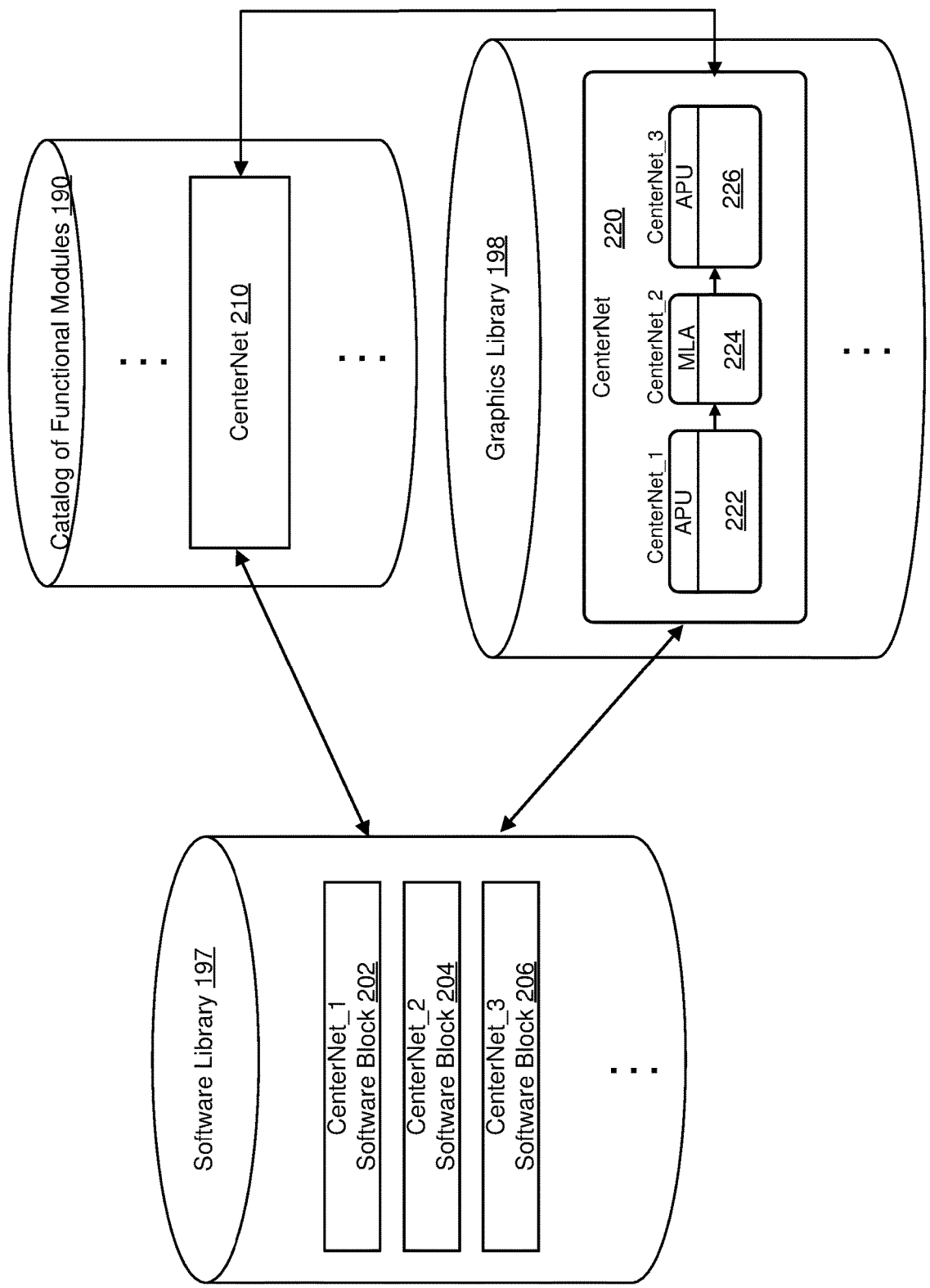
FIG. 2 is a block diagram showing an example of a catalog of functional modules, and its corresponding software and graphics libraries.

An example of a relationship between a functional module, and the corresponding graphics and software blocks are further discussed below with respect to FIG. 2. FIG. 2 illustrates an example of mapping a functional module 210 to software blocks 202, 204, 206 and a graphic 220. As illustrated in FIG. 2, the functional module is "CenterNet," which is a pre-trained ML network. CenterNet includes three functional stages CenterNet_1, CenterNet_2 and CenterNet_3, each of which is to be executed on a different hardware compute element in a particular sequence. As such, each functional stage corresponds to a separate software block 202, 204, 206 that is compiled and executed on the corresponding hardware compute element. The "CenterNet" functional module is represented by graphic 220, which includes three sub-graphics 222, 224, 226 representing the three functional stages.

A user does not need to understand how many functional stages CenterNet has, and which hardware compute element is to execute which functional stage. Instead, the user selects the hardware compute elements that are implemented on the chip (e.g., an APU, an MLA, a CVU), and inputs the functional description of the functional module, i.e., "CenterNet." Based on the user input, VDP 110 automatically partitions the CenterNet into three functional stages, and maps the three functional stages to different compute elements. In this example, CenterNet_1 is implemented by software block 202 executing on the APU, CenterNet_2 is implemented by software block 204 executing on the MLA, and CenterNet_3 is implemented by software block 206 executing on the APU.

In some embodiments, VDP 110 assembles the software blocks 202, 204, 206 into a set of source code files for the user's project. Similarly, other functional modules are mapped to their corresponding software blocks and graphics. A user can input a functional description of an ML pipeline by selecting and interconnecting multiple functional modules from the catalog 190. Based on the user input, VDP 110 generates source code and then executable components based on the functional description of the ML pipeline. As such, the user can create complex ML pipelines without writing significant amounts of code.

Returning back to FIG. 1, in some embodiments, VDP 110 also includes a key performance indicator (KPI) calculator 130 that calculates values that measure the performance of the ML pipeline corresponding to the functional description 140. These KPI values can be displayed in the GUI 150. Examples of KPIs include frames per second (FPS), power consumption, memory utilization, and processor utilization.

In some embodiments, VDP 110 is installed on a client device of a user, and the user can deploy the implementation package onto a chip 180 (also referred to as a "target chip") by connecting the chip 180 to the client device, e.g., via wired or wireless communications. In some embodiments, VDP 110 is a cloud system that is physically connected to various chips. A user can remotely access VDP 110 and cause the VDP to deploy the implementation package onto a target chip that is connected to VDP. In some embodiments, VDP 110 includes or is coupled to an emulator or simulator that emulates or simulates various chips. The implementation package may be deployed onto an emulation or simulation of the target chip.

Figure 3:
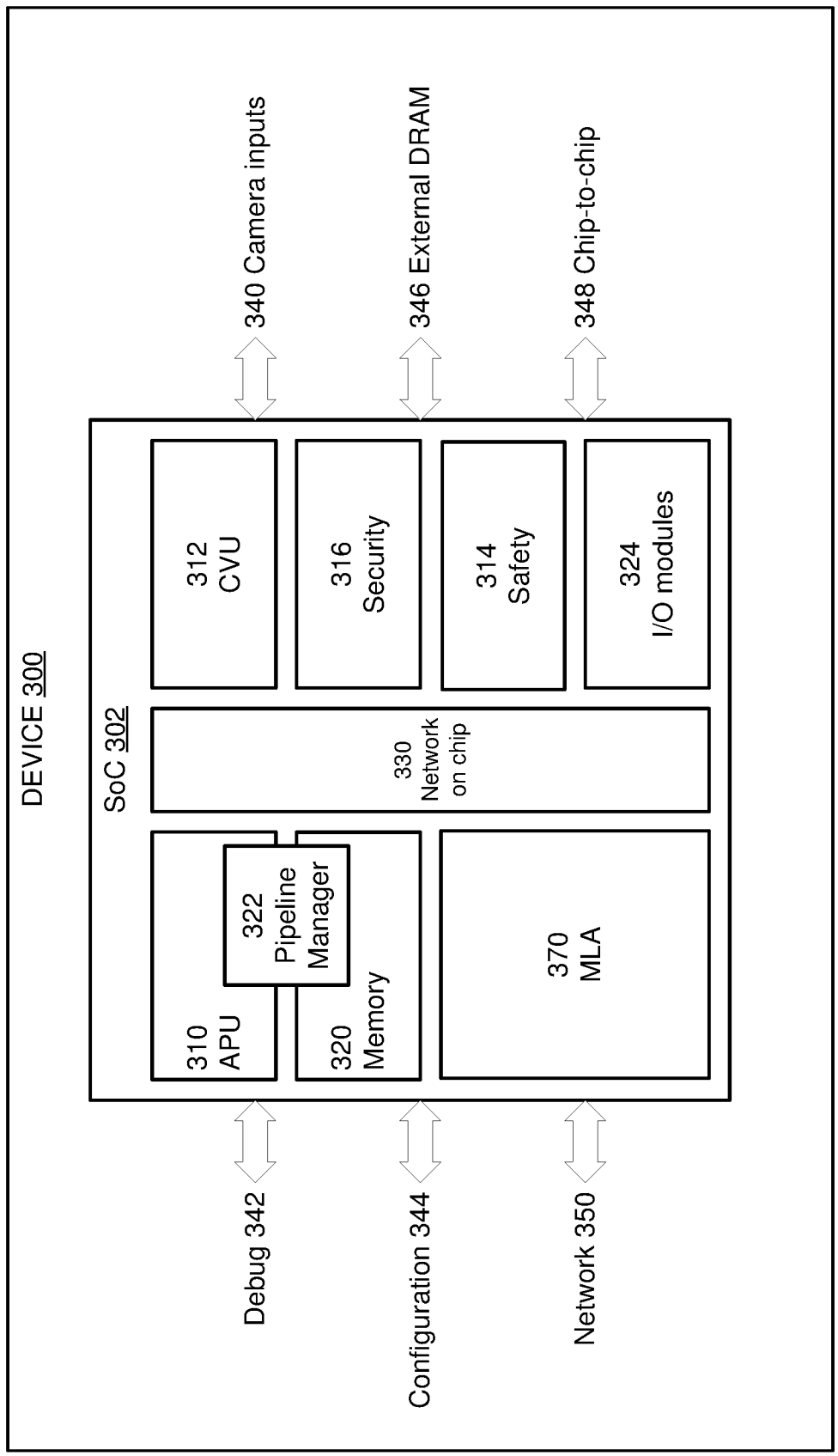
FIG. 3 is a block diagram of an example device that includes an SoC with a pipeline manager.

As briefly discussed above, once the chip receives the implementation package, a pipeline manager of the chip parses the implementation package and causes the different executable components to be executed by different hardware compute elements in proper order. FIG. 3 is a block diagram of an example device 300 with a system-on-chip (SoC) 302, which is an example of chip 180 of FIG. 1. The SoC 302 includes an MLA 370. Other components may be included on the same die as the MLA. This example includes the following additional blocks: application processing unit (APU) 310 (e.g., general purpose CPU running applications), computer vision unit (CVU) 312 (or other types of application-specific processors), safety 314, security 316, additional SRAM (memory) 320 and input/output (I/O) circuitry 324. It also includes a network 330 for communication between the different components. The connections to the external world include camera inputs 340 for the CVU 312, ports for debugging 342 and configuration 344, a connection 346 to external memory (e.g., DRAM), chip-to-chip connections 348, and network connections 350 (e.g., Ethernet and PCIe).

A pipeline manager 322 is installed on the SoC 302 and executable by APU 310. The pipeline manager 322 interprets the implementation package 170 received from the VDP 110. As discussed above with respect to FIG. 1, the implementation package 170 includes multiple executable components and specification of the interconnections between components. The pipeline manager 322 parses the implementation package 170 to extract the interconnected executable components, and distribute them to their respective hardware compute elements for execution, such as on CVU 312, MLA 370, etc.

Figure 4:
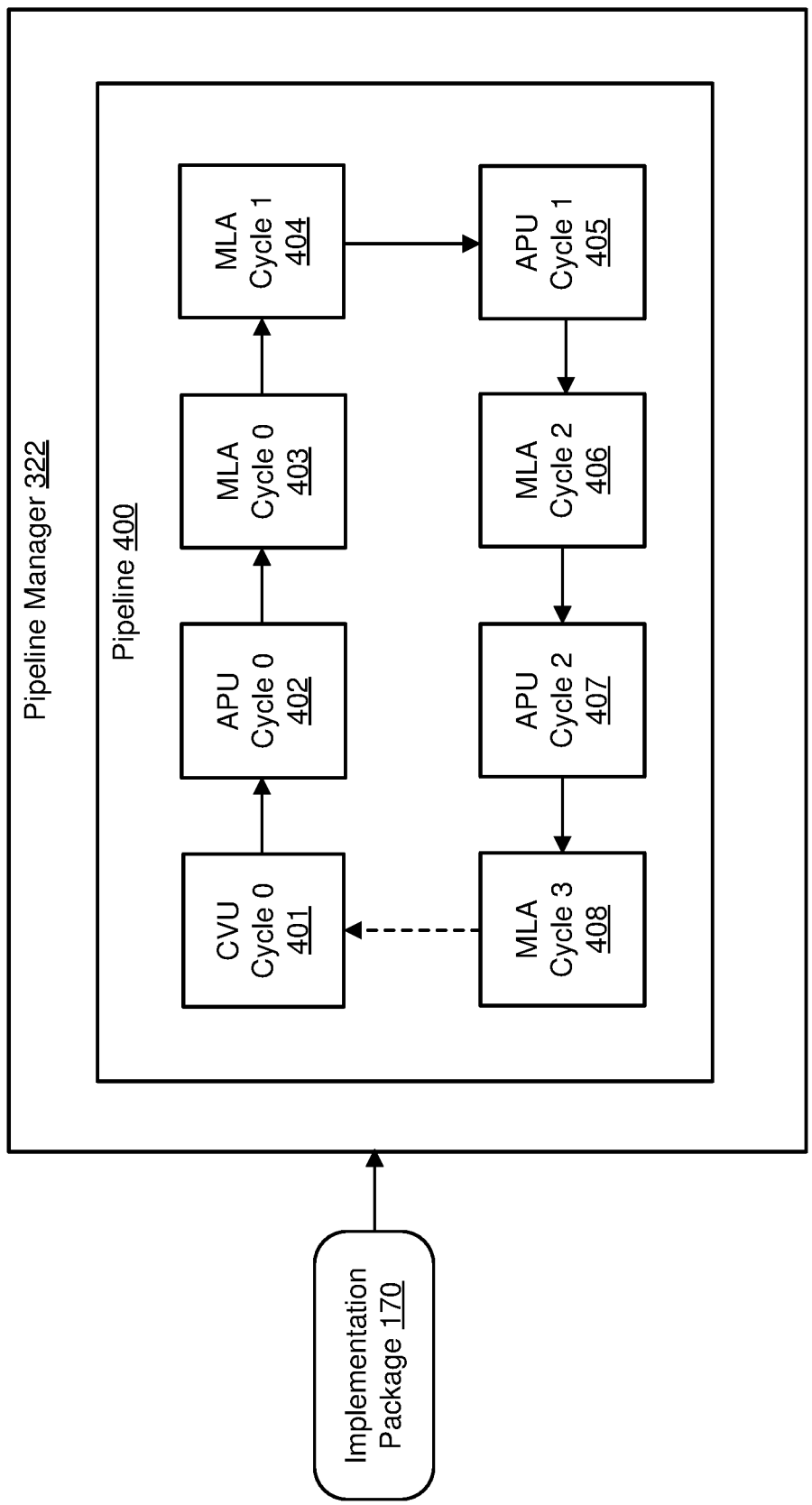
FIG. 4 is a block diagram of an example pipeline manager on an SoC.

FIG. 4 is a block diagram of an example pipeline manager 322 (e.g., GStreamer) that manages a pipeline 400 of executable components 401-408. In FIG. 4, each block includes a hardware compute element and a cycle number, indicating that during the cycle, the executable component is to be executed on the hardware compute element. For example, executable component 401 is executable on CVU 312; executable component 402 is executable on APU 310; executable component 403 is executable on MLA 370, and so on and so forth.

The pipeline manager 322 manages the timing and the location of execution of the executable components 401-408 based on information in the implementation package 170. In this example, executable components 401-403 are executed starting in cycle 0. Executable components 404-405 are executed starting in cycle 1. Executable components 406-407 are executed starting in cycle 2. Executable component 408 is executed starting in cycle 3. The components 401-408 are connected in a pipeline as shown.

In some embodiments, after the executable component 408 is executed, a new round of operations may be performed, starting from block 401 again as indicated by the dashed arrow. For example, the pipeline 400 may perform object recognition to identify an object from a video stream. The pipeline 400 may be tasked to constantly monitor the frames of images in the video stream to identify the object. After a first frame of image is processed, the pipeline is executed again to process a second frame of image.

Referring back to FIG. 3, in addition to memory and other programmable processors, the edge device 300 may also include sensors, such as cameras (both still image and video cameras), microphones, temperature sensors, pressure sensors, and other types of sensors. The sensors may capture samples that are used as inputs to a pipeline within the edge device. For example, image samples may be input to the CVU 312, which performs initial operations such as edge detection and enhancement, contrast enhancement, motion detection, and optical flow. These may be earlier functional modules in the pipeline. Raw and/or processed images may then be input to the MLA 370 for analysis by the ML network. The MLA 370 may also receive other inputs, such as metadata from other sources and data from other sensors. The APU 310 may also perform various functions in the overall pipeline and serve as a master controller that coordinates the operation of the MLA 370 and the other hardware compute elements in the pipeline.

Example applications for edge device 300 include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks.

Traditionally, a user would have to understand details about various software functions and various hardware compute elements on the SoC 302, so that the user can write source code for the software functions that are to be executed on different hardware compute elements. There is a steep learning curve for even experienced engineers to be able to grasp the nuances of each SoC.

VDP 110 solves this problem by providing an interface in which a user provides functional descriptions of different processes (i.e., functional modules). The VDP synthesizes the functional modules of the pipeline into a plurality of interconnected executable components, which can be deployed onto the SoC. As such, users do not have to understand the details of various software functions and the different hardware compute elements. The functional descriptions may be entered via text format, such as JSON code, or any descriptive language. Alternatively, or in addition, the functional descriptions may be entered via drag and drop of graphics representing different functions onto a canvas area of a GUI.

Figure 5A:
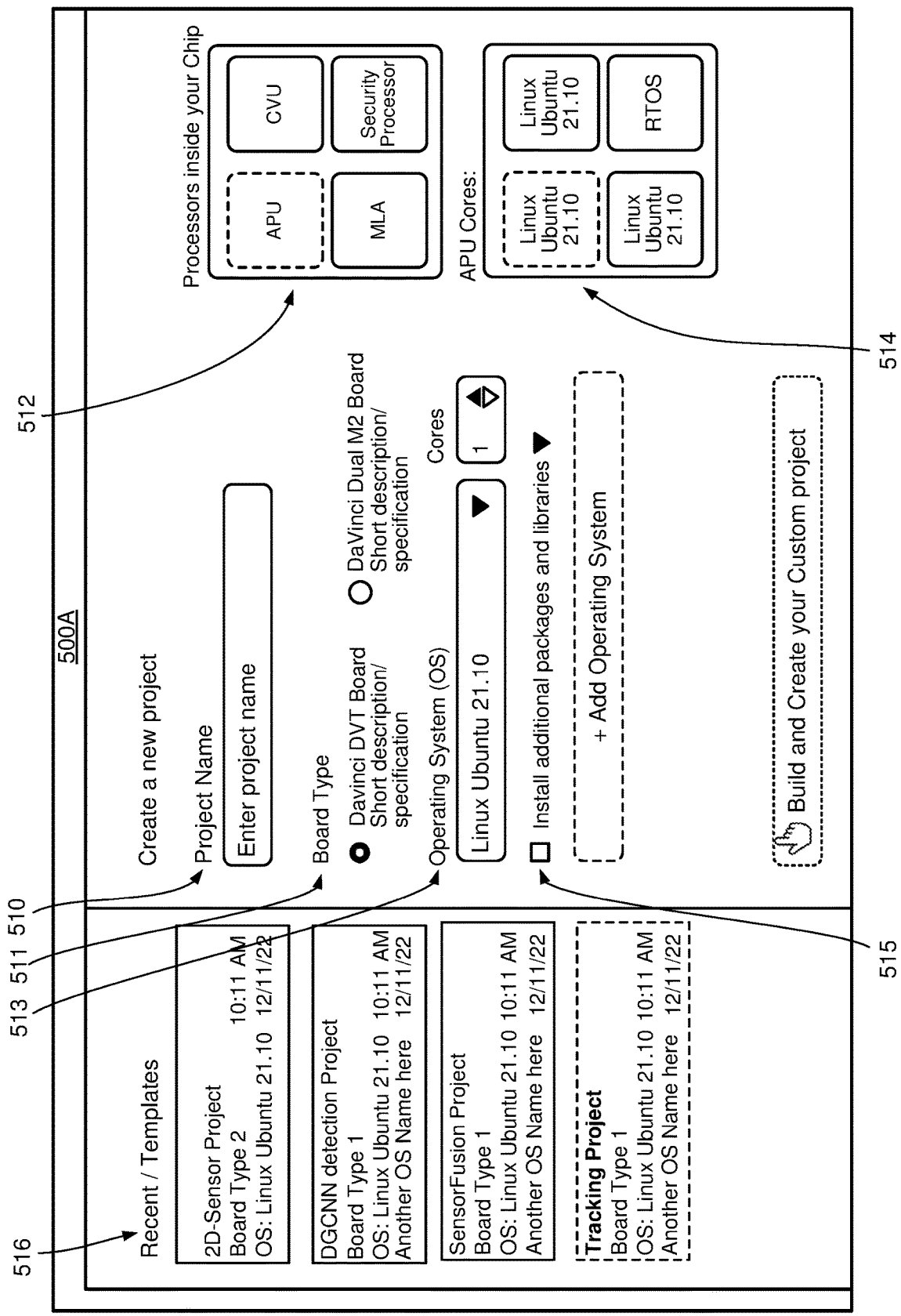
FIG. 5A is an example graphical user interface (GUI) of the VDP for users to create a new project.

FIG. 5A illustrates an example graphical user interface (GUI) of VDP 110 for a user to create a new project or application. The user can enter a project name 510, select a board type 511, select different hardware compute elements (e.g., APU, CVU, MLA, and other compute elements or processors) 512 in a chip, select operating systems 513 (e.g., Linux, RTOS, etc.), and select cores 514 for an SoC. The user can also choose to install additional packages and libraries 515 onto the SoC, such as an additional operating system. The user may also create new projects based on recent projects or templates 516. As described in more detail below, the user can also specify different pipelines to be implemented on the SoC. When the new project is created, VDP 110 generates a set of source code from a software library. The library may include a set of folders containing a set of source code files, which may be written in various programming languages, such as C, C++, C#, java, JavaScript, JSON, etc.

VDP 110 can also generate different views of the project, such as canvas view, source code view, pipeline view, or executable code view. The canvas view is a GUI that looks like a canvas, and a user can generate a functional description of an ML pipeline by dragging and dropping different functional modules onto the canvas, and linking the functional modules on the canvas. When an additional functional module is dragged onto the canvas, or an additional link is created between two different functional modules, VDP 110 modifies the set of source code, causing the source code to include the corresponding software blocks and their interconnections.

The code view is a GUI that looks like a code editor, and a user can review and edit the set of source code generated by VDP 110. The pipeline view is a GUI that shows a pipeline of interconnected software blocks corresponding to the project. The pipeline view may be generated after the source code is compiled into executable code including multiple executable components, each of which is executable on a particular hardware compute element. The compiled code may be viewed and deployed onto an SoC in the executable code view. The interconnections among the multiple executable components may be presented in JSON format. The JSON code may also be viewed and edited via the executable code view.

Figure 5B:
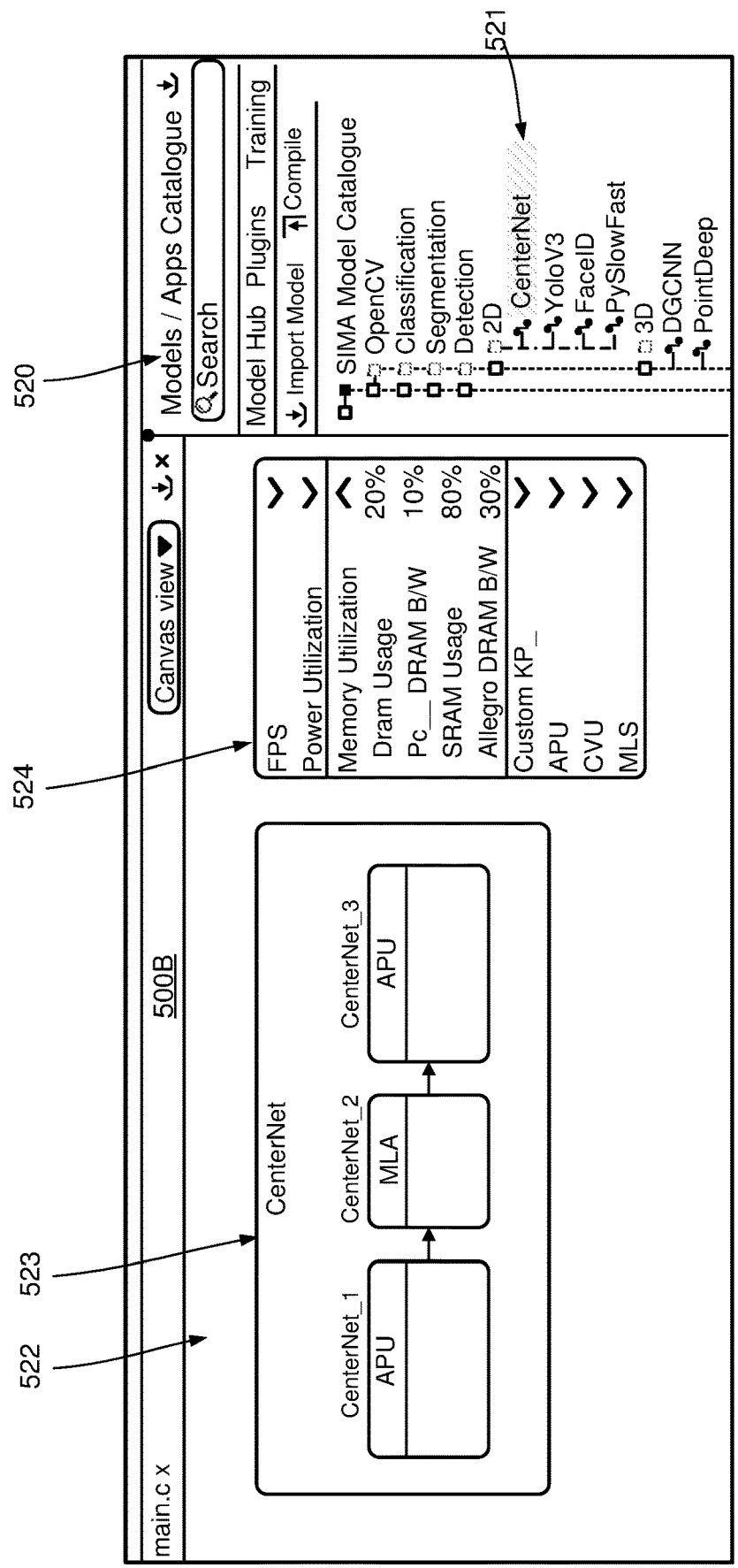
FIG. 5B is an example GUI of the VDP in canvas view, where users can drag and drop functional modules, including models and apps, from a catalog area onto a canvas area.

FIGS. 5B-5E illustrate example GUIs of VDP 110 in the canvas view. FIG. 5B illustrates a GUI 500B. On the right side of the GUI 500B, there is a models/apps catalog 520 showing a list of ML models and other functional modules. In FIG. 5B, the user has selected a 2D convolutional ML network, called CenterNet 521, as indicated by the crosshatch. The user may click "CenterNet" in the catalog to select it, or drag it onto the canvas area 522. Once the CenterNet is selected or placed on the canvas, the VDP 110 updates the canvas area to show a graphic 523 representing the CenterNet functional module. The CenterNet module includes three software blocks, each of which is to be performed by a particular hardware compute element. The graphic 523 includes graphics representing the three software blocks and indicating the corresponding hardware compute element. In this example, the first and third functional stages are executed by the APU, while the second functional stage is executed by the MLA. The VDP 110 also updates the set of source code to include the software blocks corresponding to CenterNet.

Note, the user does not need to know how many functional stages (software blocks) the CenterNet has, or which hardware compute element of the SoC executes which functional stage. In response to the user's drag and drop of the CenterNet into the canvas area, VDP 110 automatically updates the source code to include the software blocks corresponding to CenterNet, which includes the three blocks. VDP 110 maps each of the three blocks to a particular hardware compute element implemented in the SoC. The hardware compute elements of the SoC may be automatically set by VDP 110 or selected by the user. In some embodiments, VDP 110 may consider different hardware compute elements for each block. The VDP 110 represents the CenterNet on the canvas area using a graphic that includes the three functional stages and their corresponding hardware compute elements.

In some embodiments, the VDP 110 also computes various key performance indicators (KPIs) based on the generated pipeline. As shown in area 524 of FIG. 5B, the GUI shows frame per second (FPS), power utilization, memory utilization, each hardware compute element's utilization.

Figure 5C:
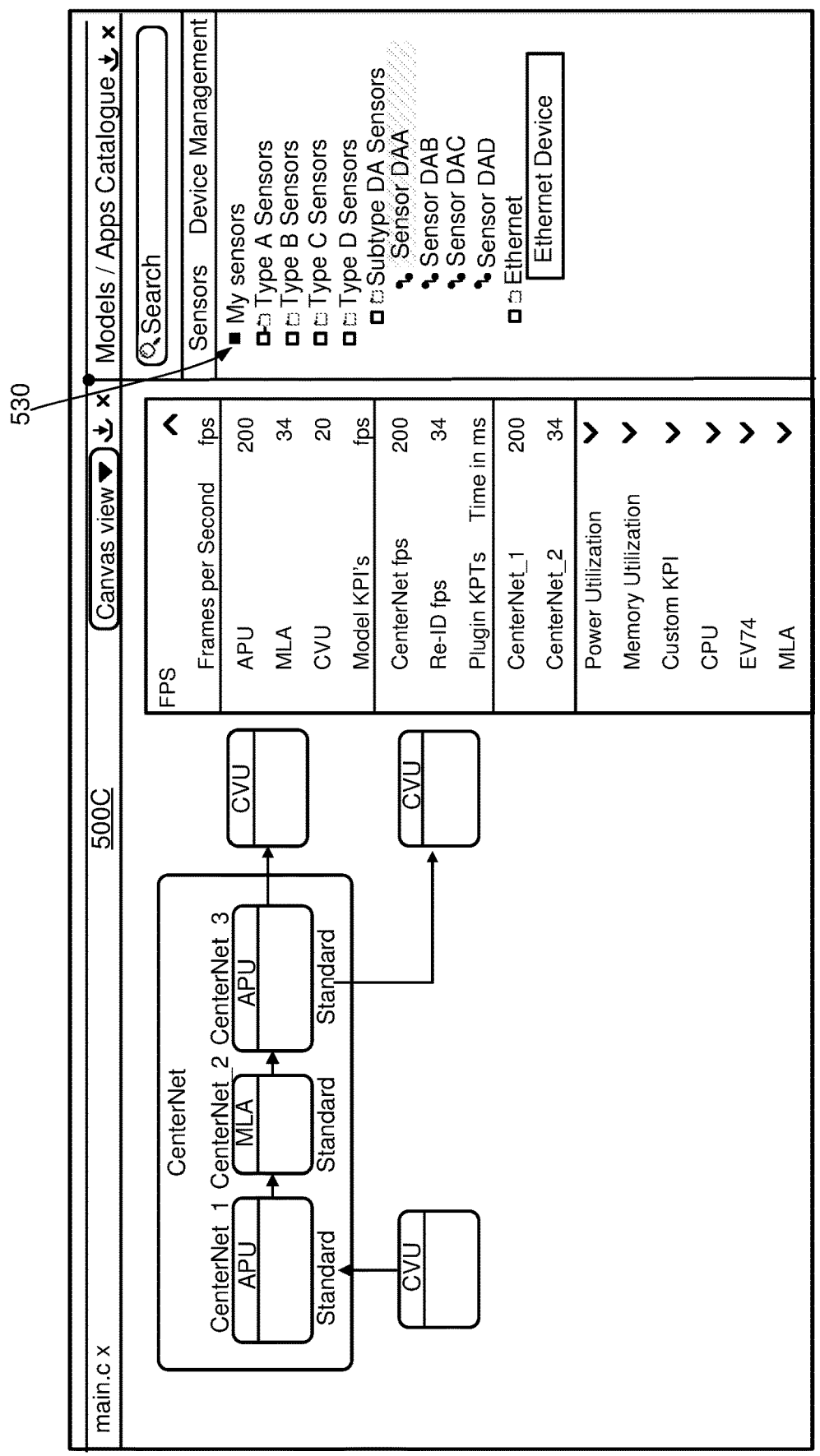
FIG. 5C is an example GUI of the VDP in canvas view, where users can link functional modules on a canvas area with arrows.

FIG. 5C illustrates a GUI 500C showing a list 530 of functional modules for sensors and ethernet devices that may be used in the project. A user can select one or more of these sensors or ethernet devices as a data source (e.g., drag and drop a sensor or ethernet device into the canvas area), and connect the functional modules in the canvas area (e.g., by linking them with arrows). Again, a user does not need to know how many functional stages are in each functional module, or which hardware compute element executes the corresponding software. VDP 110 automatically modifies the source code to reflect the added sensors or other devices and recomputes KPIs, while updating the graphic in the canvas area.

In some embodiments, VDP 110 detects incorrect connections made by users. For example, when a user links two functional modules that are not supposed to be linked together, or the linking direction is incorrect, VDP 110 may generate a warning to alert a user. For example, when a user links an ML model output to a sensor block input, VDP 110 may generate an alert, suggesting that the user changes the arrow direction to link the sensor block output to the ML model input.

Figure 5D:
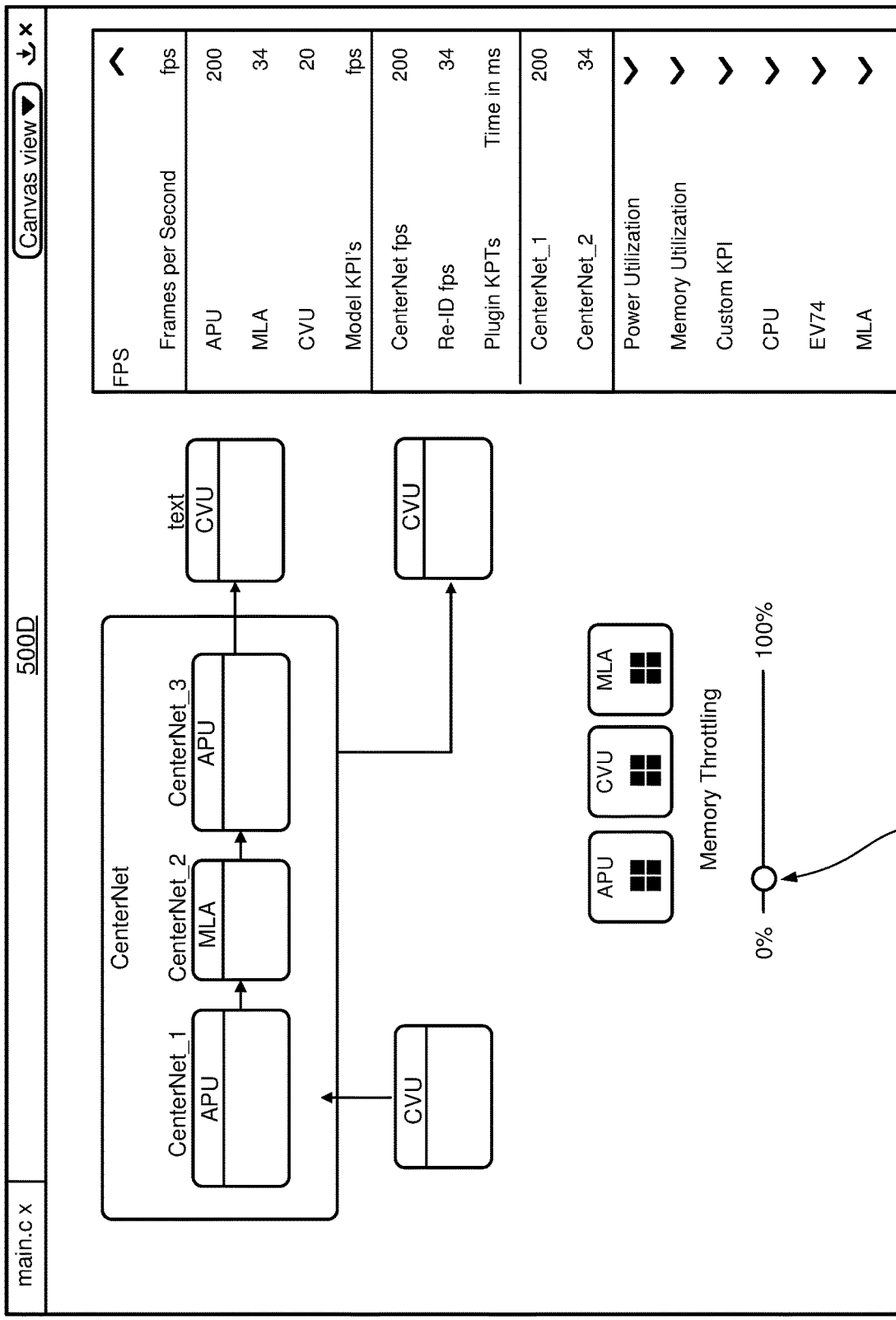
FIG. 5D is an example GUI of the VDP in canvas view, where users can adjust memory throttling for hardware compute elements.

FIG. 5D illustrates a GUI 500D, in which a user is able to adjust memory throttling for each hardware compute element using slider 540. Memory throttling restricts read and/or write traffic to main memory as a means of controlling power consumption. The KPIs are updated based on the adjusted memory throttling. Again, VDP 110 would update the source code to reflect the adjustment of the memory throttling. Power consumption is an important concern for applications deployed on edge devices. Thus, it is advantageous for a user to be able to see correlations between power consumption and performance during the design stage, and adjust memory throttling of hardware compute elements accordingly.

Figure 5E:
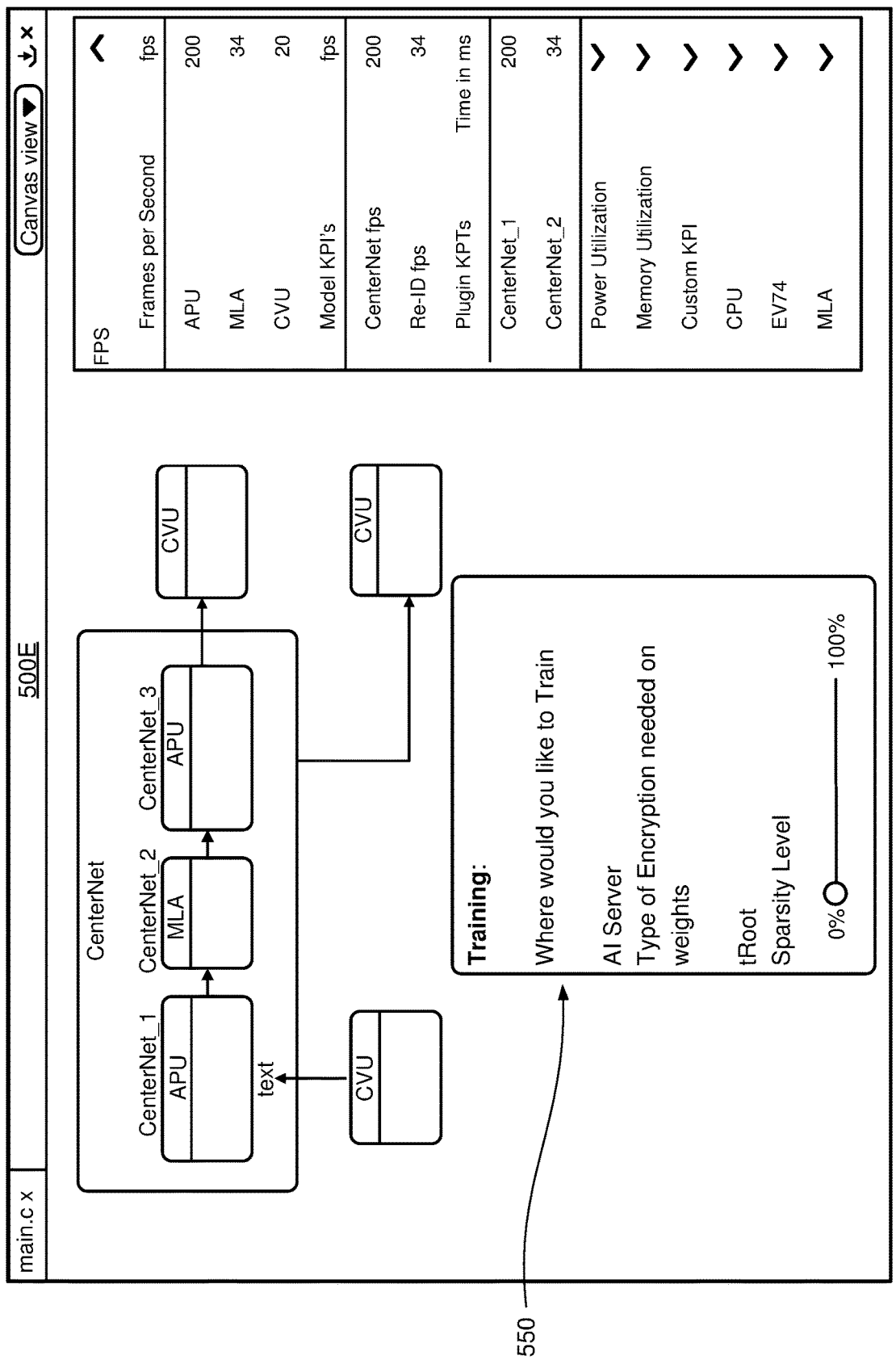
FIG. 5E is an example GUI of the VDP in canvas view, that allows users to train their own models and import the trained models into the catalog of functional modules.

FIG. 5E illustrates a GUI 500E, in which a user is provided an option to train their own models. In some embodiments, the training can be performed by an AI server that is associated with VDP 110. Alternatively, the training can be performed on a client device of the user. The user can configure various hyperparameters for the training, as shown by 550. Once the model is trained, the model can be added to the library or catalog of VDP 110.

FIG. 5F illustrates an example GUI 500F of VDP in the source code view. As shown in FIG. 5F, the source code is written in C programming language. Each of the functional modules, models, sensors, and/or devices includes software blocks, which are software components that can be added or linked to the C source code framework. Each of the software block that is added or linked to the project is also referred to as a "plugin," which corresponds to a JSON file. The JSON file describes the relationships between the software block and other source code associated with the project. A list of source code files and plugins are shown on a left panel 560 of the GUI. A source code viewer or editor is shown on the right side 561 of the GUI. When a user selects one of the source code files on the left panel 560, the selected source code file is displayed on the viewer/editor side 561. It is advantageous for expert users to be able to view and modify source code, although no modification or coding is required for a user to create and execute an application.

After a user finishes their design of a project, VDP 110 compiles the source code into executable components, and packages the executable components into an implementation package based on their interconnections. In some embodiments, once the source code is compiled, VDP 110 can generate a pipeline view of the application, showing the interconnections of each executable component.

Figure 5G:
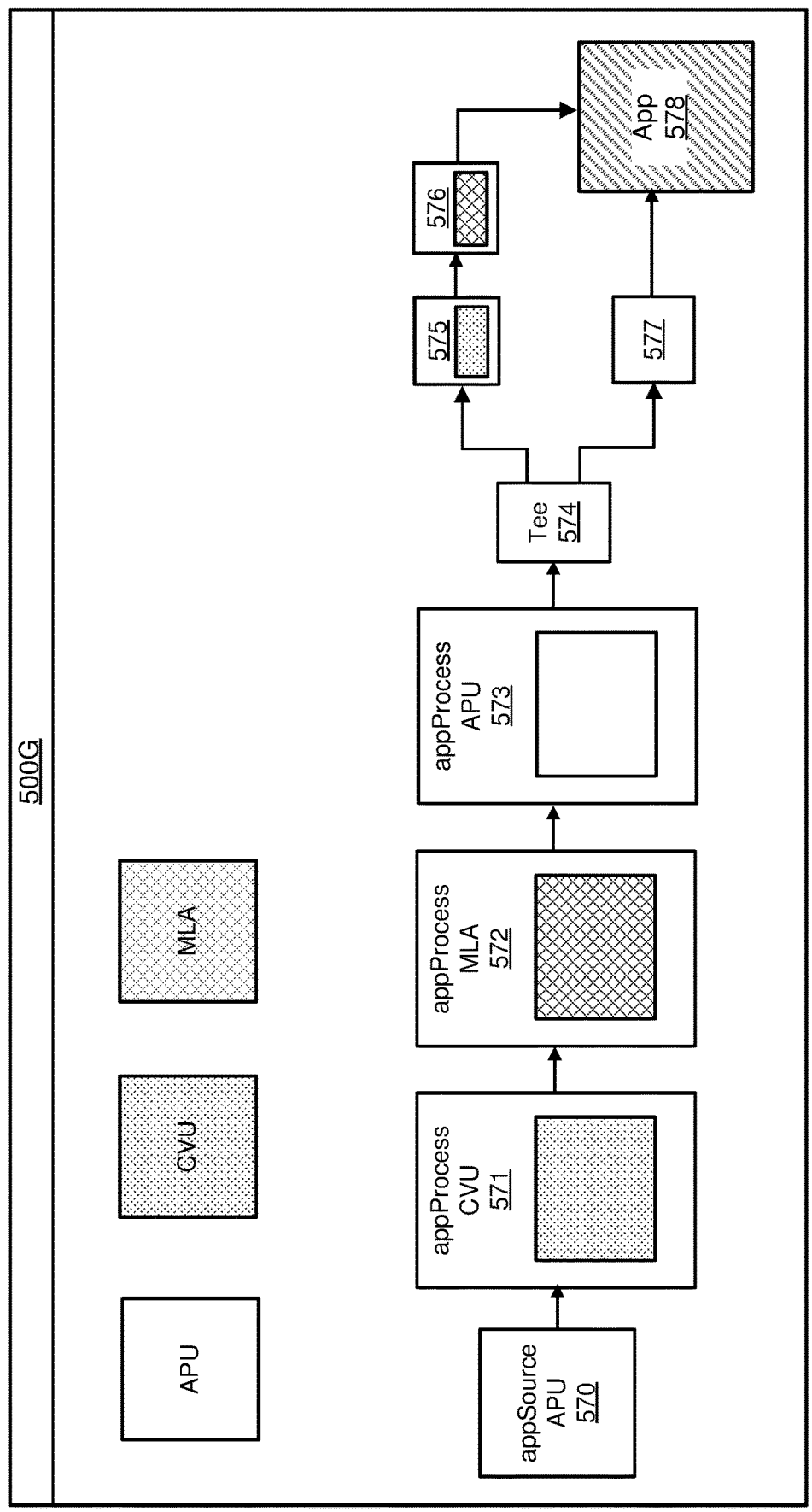
FIG. 5G is an example GUI of the VDP in pipeline view, where users can view a pipeline of interconnected executable components and their corresponding hardware compute elements.

FIG. 5G illustrates an example GUI 500G of VDP in the pipeline view. The GUI 500G shows a pipeline of multiple interconnected blocks, each of which corresponds to an executable component, and a hardware compute element. The executable component is executed on the hardware compute element. For example, block 570 executes on the APU, block 571 executes on the CVU, block 572 executes on the MLA, and so on and so forth. Further, the arrows linking different executable components represent the interconnections between components. For example, data flows from block 570 to block 571 to block 572, etc. The tee block 574 splits the pipeline into two branches. The top branch includes blocks 575 and 576. The bottom branch includes block 577. Both branches flow into block 578.

FIG. 5H illustrates an example GUI 500H of VDP in the executable code view. This GUI 500H includes a left panel 580 that shows a list of files that are related to the implementation package, and a viewer or editor 581 on the right.

A user can click "install implementation package" link 582 to cause the implementation package to be installed or deployed onto the SoC. In some embodiments, the implementation package includes multiple executable components and a JSON file that describes relationships among the multiple executable components. When the user selects the implementation package on the left panel, the JSON file is shown in the viewer or editor. For example, as illustrated in FIG. 5H, the implementation package (in JSON format) includes two executable files, CVU_3.bin and APU_3.bin. CVU_3.bin is executable by a CVU of the SoC, and APU_3.bin is executable by an APU of the SoC. A user can modify the JSON file, while no modification or coding is required to get the implementation package to be deployed onto the SoC.

In some embodiments, VDP 110 also automatically generates documentation for the implementation package. The documentation describes the functions of each executable component and/or their corresponding source code. A user can read the documentation to better understand the functions and interrelations among the different plugins integrated into the project.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A development platform for implementing a machine learning pipeline on a chip containing a plurality of hardware compute elements, the development platform comprising:
   a user interface that facilitates a user to develop a functional description of the machine learning pipeline, wherein the functional description specifies a plurality of functional modules that form the pipeline, and at least one functional module includes a machine learning model;
   a library of software blocks that implement the functional modules on the hardware compute elements of the chip, wherein the library of software blocks includes software blocks for implementing a plurality of machine learning models, a plurality of sensor plugins, and a plurality of ethernet device plugins; and
   a synthesis engine configured to:
      synthesize the pipeline of functional modules into a plurality of interconnected executable components of the software blocks, wherein the machine learning pipeline is synthesized into executable components that execute on at least two different hardware compute elements of the chip; and
      generate an implementation package comprising the executable components and specifying interconnections between the executable components.

2. The development platform of claim 1 further comprising:
   a key performance indicator (KPI) calculator that computes a KPI based on the interconnected executable components the KPI displayed in the user interface.

3. The development platform of claim 2 wherein the KPI includes at least one of frames per second (FPS), power consumption, memory utilization, and processor utilization.

4. The development platform of claim 2 wherein the KPI includes KPIs for each of the hardware compute elements.

5. The development platform of claim 2 wherein, responsive to the user's modification of the pipeline of functional modules, the KPI calculator updates the KPI.

6. The development platform of claim 1 wherein the user interface includes a graphical user interface (GUI) that displays a catalog of functional modules and allows the user to select functional modules from the catalog.

7. The development platform of claim 6 wherein the GUI further includes a canvas area; and, responsive to the user dragging functional modules from the catalog to the canvas area, the GUI displays the dragged functional modules in the canvas area.

8. The development platform of claim 6 wherein one of the selected functional modules includes a plurality of submodules that execute on corresponding hardware compute elements, and the GUI displays the plurality of submodules and the corresponding hardware compute elements.

9. The development platform of claim 6 wherein the GUI displays one or more parameters of a hardware compute element, and allows the user to modify the one or more parameters of the hardware compute element.

10. The development platform of claim 1 wherein the synthesis engine is further configured to
   generate source code files for software blocks implementing the pipeline of functional modules, and
   compile the source code files into the plurality of interconnected executable components.

11. The development platform of claim 1 wherein the synthesis engine is further configured to:
   determine whether a connection between two functional modules is correct, and
   responsive to determining an incorrect connection, generate an error alert.

12. The development platform of claim 1 further comprising a model training engine configured to:
   train a custom machine learning model based on user input, and
   include software blocks for implementing the custom machine learning model in the library.

13. The development platform of claim 1 wherein the library of software blocks includes proprietary software blocks, open source software blocks, and user-generated software blocks.

14. The development platform of claim 1 further comprising a library of different chips comprising different processors, and a user is allowed to select a target chip from the library of chips, and the synthesis engine generates the executable components based on the processors on the target chip.

15. The development platform of claim 1 wherein the library of software blocks comprises software blocks for implementing a plurality of machine learning models.

16. The development platform of claim 1 further comprising:
   a library of reference pipelines.

17. The development platform of claim 1 wherein the development platform supports a concurrent design of multiple different chips and multiple different versions of chips.

18. The development platform of claim 1 wherein the development platform is a cloud-based service.

19. The development platform of claim 1 wherein the development platform is connected to the chip, and configured to receive a KPI of the chip when the executable components are executed by the hardware compute elements of the chip.

20. A development platform for implementing a machine learning pipeline on a chip containing a plurality of hardware compute elements, the development platform comprising:
 a user interface that facilitates a user to develop a functional description of the machine learning pipeline, wherein the functional description specifies a plurality of functional modules that form the pipeline, and at least one functional module includes a machine learning model;
 a library of software blocks that implement the functional modules on the hardware compute elements of the chip;
 a library of different chips comprising different processors; and
 a synthesis engine configured to:
  synthesize the pipeline of functional modules into a plurality of interconnected executable components of the software blocks, wherein the machine learning pipeline is synthesized into executable components that execute on at least two different hardware compute elements of the chip; and
  generate an implementation package comprising the executable components and specifying interconnections between the executable components, wherein a user is allowed to select a target chip from the library of chips, and the synthesis engine generates the executable components based on the processors on the target chip.

21. A development platform for implementing a machine learning pipeline on a chip containing a plurality of hardware compute elements, the development platform comprising:
 a user interface that facilitates a user to develop a functional description of the machine learning pipeline, wherein the functional description specifies a plurality of functional modules that form the pipeline, and at least one functional module includes a machine learning model;
 a library of software blocks that implement the functional modules on the hardware compute elements of the chip, wherein the development platform supports a concurrent design of multiple different chips and multiple different versions of chips; and
 a synthesis engine configured to:
 synthesize the pipeline of functional modules into a plurality of interconnected executable components of the software blocks, wherein the machine learning pipeline is synthesized into executable components that execute on at least two different hardware compute elements of the chip; and
 generate an implementation package comprising the executable components and specifying interconnections between the executable components.

\* \* \* \* \*